J. S. HARBISON.
Bee Hive.
No. 26,431.
Patented Dec. 13, 1859.
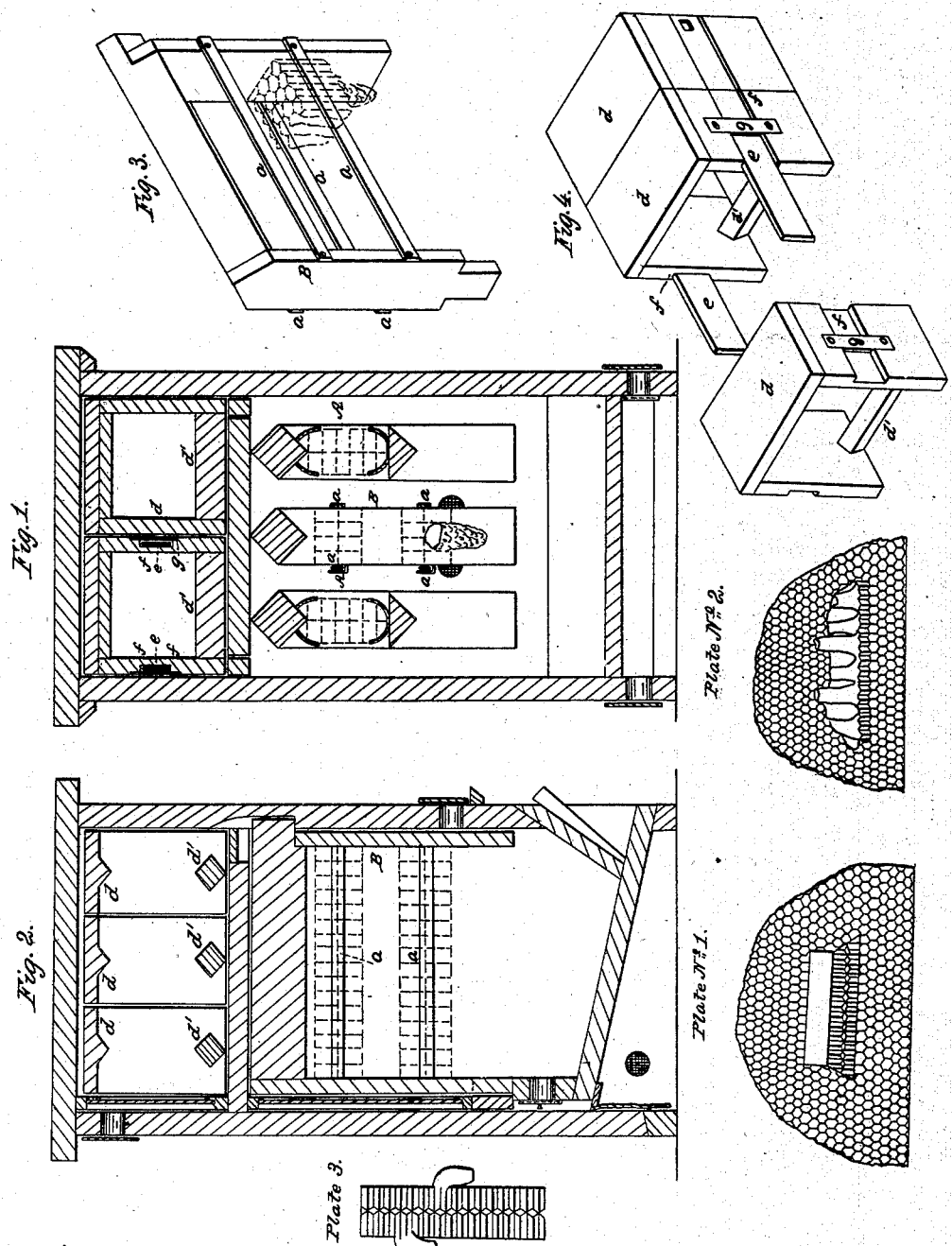
Witnesses:
Inventor:
John S. Harbison

UNITED STATES PATENT OFFICE.

JOHN S. HARBISON, OF SACRAMENTO, CALIFORNIA.

BEEHIVE.

Specification of Letters Patent No. 26,431, dated December 13, 1859.

*To all whom it may concern:*

Be it known that I, JOHN S. HARBISON, of Sacramento, in the county of Sacramento and State of California, have invented a new and useful Improvement in Beehives or Arranging the Brood-Comb in the Same; and I do hereby declare that the following is a full, clear, and exact description of the same, reference being had to the accompanying drawings, forming a part of this specification, in which—

Figure 1, is a vertical transverse section of a bee hive with my improvement applied to it. Fig. 2, is a vertical longitudinal section of the same. Fig. 3, is a perspective view of the queen nursery. Fig. 4, is a perspective view of the honey box. Figs. 5 and 6, show portions of a honey-comb cut out and one half of said removed portion with its cells turned down perpendicularly, dovetailed in the space formed in the honey comb, sufficient room being left for the queen cells to be constructed as illustrated in Fig. 5. Fig. 7, shows the manner in which the bees ordinarily construct queen cells when the "worker cells" are left in a horizontal position.

Similar letters of reference in each of the several figures indicate corresponding parts.

The nature of my invention consists in placing the bee comb known as worker cells in a horizontal or nearly horizontal position so that the cells shall be vertical or nearly vertical, instead of horizontal, by the means substantially as hereinafter described and represented. This vertical position of the cells enables the bees to facilitate their labors in the construction of queen cells, as hereinafter described.

To enable others skilled in the art to make and use my invention, I will proceed to describe its construction and operation.

In the drawing, I have shown my present improvement applied to a hive patented by myself Jany. 4, 1859, and therefore shall not describe said hive any further than may be necessary in making evident my present invention.

A, A, represents a series of vertical "worker" frames placed in the body of the hive. The frame B, is what I shall term a queen nursery. It is constructed by attaching metallic or other suitable strips *a, a,* horizontally to the sides of any one of the movable frames A, leaving a space of about one inch from the top and about two inches apart; each pair of strips forming an apartment for the reception of separate sections of worker cells, and one of each pair of strips being movable by a hinge or pivot, so as to open and allow access to the comb when it is desired to cut off portions of the same which contain embryo queens. Into each of the apartments of the frame B, I place brood comb ("worker cells") cut into sections and containing newly laid eggs. These sections fit the space between each pair of strips. The brood comb is arranged so that its cells stand vertical instead of horizontal. The frame B, thus furnished with brood comb, I place between other combs or frames A, A, which contain a colony of bees destitute of a queen, and the bees immediately set to work and construct any desired number of queen cells in a straight, regular and perpendicular form without building them in that circular overhanging form which is necesssary when constructed from horizontal worker cells. By thus arranging a queen nursery, a surer method of inducing bees to rear more queens is accomplished by affording them greater facilities for constructing queen cells, and in such a manner that they can be separated without bruising or in any way injuring any of them.

The importance of an efficient mode of raising queens to supply colonies is well understood by practical apiarians and has been discussed by *Langstroth on the Honey Bee,* also the celebrated Huber in his book on the honey bee. And since the introduction of the various sectional movable worker frames for hives it has become doubly important, in order to facilitate the increase of bees by dividing the colony or forming artificial swarms.

It seems necessary in the economy of the bee to suspend the queen cell perpendicularly as illustrated in Figs. 1 and 3 of my drawings. In doing this from worker cells occupying a horizontal position the queen cell is frequently projected beyond the comb to which it is attached, as illustrated in Langstroth's work at page 192, and comes in contact with the comb in a manner to render impossible the removal of said comb, when it is desired to gain access to the queen cell, without endangering and often fatally injuring the queen cell. My queen nursery enables the apiarian to rear any desired number of queens with ease and certainty in a short time.

My honey box which is arranged above the sectional movable frames so as to rest on the knife edge top cross pieces of the frames is made in series of sections $d$, $d$, which are open at bottom and both ends. These sections have each a bottom cross bar $d'$, of diamond form attached to it, so that the bees will have a chance to build separated combs in each section. The bar is made of diamond form so that when the bees have worked down to the horizontal axis of the bar they will commence to finish and round off in a neat manner, instead of going down farther and attaching the comb to the bottom board. The sections are united together by means of two long side strips $e$, $e$, and gains $f$, $f$, cut in the sides of the sections, said strips fitting into the gains and being confined by eyes or staples $g$, $g$, attached to the sections as shown. It will be seen that the sections all communicate, and thus the bees will work more profitably than would be the case if the sections did not communicate, and yet while this advantage is obtained either of the sections is capable of being removed, as illustrated in Fig. 4, and the advantage of selling the honey in small quantities and complete small combs, at the market, obtained.

What I claim as my invention and desire to secure by Letters Patent, is—

Placing the bee comb known as worker cells in a horizontal or nearly horizontal position, so that the cells shall be vertical or nearly vertical, instead of horizontal, by the means, or their equivalents, substantially as set forth, and represented.

JOHN S. HARBISON.

Witnesses:
E. B. CROCKER,
W. C. HARBISON,
JNO. C. BARR.